3,322,738
PROCESS FOR TERMINATING THE ORGANO-
LITHIUM CATALYSIS OF DIENE POLYM-
ERIZATION AND PRODUCT RESULTING
THEREFROM
Carl A. Uraneck, James N. Short, Robert P. Zelinski, and Henry L. Hsieh, Bartlesville, Okla., assignors to Phillips Petroleum Company, a corporation of Delaware
No Drawing. Filed Mar. 9, 1964, Ser. No. 350,599
18 Claims. (Cl. 260—84.7)

This invention relates to reacting polymeric materials. In one aspect the invention relates to reacting a polymer terminated with an alkali metal atom. In another aspect the invention relates to polymeric materials prepared by terminating terminally reactive polymer prepared in the presence of an organoalkali metal initiator.

This is a continuation-in-part of a patent application, Ser. No. 772,167, filed Nov. 6, 1958, by Carl A. Uraneck et al., now U.S. Patent 3,135,716.

As used herein, the term "terminally reactive polymer" designates polymer which contains a reactive group at either or both ends of the polymer chain. The term "mono-terminally reactive polymer" designates polymer which contains a reactive group only at one end of the polymer chain.

It has been discovered that new and useful polymers can be prepared by polymerizing polymerizable monomers to liquid, solid, or semisolid polymers which contain reactive groups at either one or both ends of the polymer chain and double bonds within the polymer chain. New and useful solid materials can also be obtained by reacting and/or curing these terminally reactive polymers.

The monomers which can be employed in the preparation of these terminally reactive polymers include a wide variety of materials. The preferred monomers are the conjugated dienes containing from 4 to 12 carbon atoms and preferably 4 to 8 carbon atoms, inclusive, per molecule. The term "polymer" as defined herein includes both homopolymers and copolymers. Examples of suitable conjugated dienes that can be polymerized to form terminally reactive polymers which can be terminated by the method of this invention are: 1,3-butadiene, 2-methyl-1,3-butadiene (isoprene), 2,3-dimethyl-1,3-butadiene, 1,3-pentadiene (piperylene), 2-methyl-1,3-hexadiene, 2-phenylbutadiene, 3-methyl-1,3-pentadiene, 2-phenyl-3-ethylbutadiene, 1,3-octadiene, and the like.

In addition, conjugated dienes containing reactive substituents along the chain can also be employed, such as for example, halogenated dienes, such as chloroprene, fluoroprene, etc. Of the conjugated dienes the preferred material is butadiene, with isoprene and piperylene also being especially suitable.

In addition to the conjugated dienes other monomers which can be employed, either alone or in admixture with the conjugated dienes, are compounds containing an active $CH_2=C<$ group. Inclined among these latter compounds are vinyl-substituted aromatic compounds including, but not limited thereto, styrene, paramethoxystyrene, divinylbenzene, 3,-vinyltoluene, 1-vinylnaphthalene, 2-vinylnaphthalene, 3-methylstyrene, 2-vinylanthracene, 3-vinylfluorene and the like. Preferably the viny-substituted aromatic compounds contain 8 to 16 carbon atoms per molecule, more preferably 8 to 12 carbon atoms per molecule. Other monomers in this group include heterocyclic nitrogen-containing monomers, such as pyridine and quinoline derivatives containing at least 1 vinyl or alphamethylvinyl groups, such as 2-vinylpyridine, 3-vinylpyridine, 4-vinylpyridine, 3-ethyl-5-vinylpyridine, 3-methyl - 5 - vinylpyridine, 2-methyl-5-vinylpyridine, 3,5-diethyl-4-vinylpyridine, etc.; similar mono- and di-substituted alkenyl quinolines; acrylic acid esters, such as methyl acrylate, ethyl acrylate; alkacrylic acid esters, such as methyl methacrylate, ethyl methacrylate, propyl methacrylate, ethyl ethacrylate, butyl methacrylate; nitriles such as acrylonitrile, and the like.

The term polymer as defined herein includes not only homopolymers and random copolymers of the above materials, but also block copolymers which are formed by polymerizing a monomer onto the end of a polymer, the monomer being introduced in such a manner that substantially all of the co-reacting molecules enter the polymer chain at this point. The block copolymers can include combinations of homopolymers and copolymers of the above materials hereinbefore set forth.

These terminally reactive polymers are prepared by contacting the polymerizable monomer or monomers with an organoalkali metal compound. The organoalkali metal compounds preferably contain from 1 to 4 alkali metal atoms, including lithium, sodium, potassium, rubidium and cesium, with those containing one or two alkali metal atoms being more often employed. Lithium is the preferred alkali metal.

The organoalkali metal compounds can be prepared in several ways, for example by replacing halogens in an organic halide with alkali metals, by direct addition of alkali metals to a double bond, or by reacting an organic halide with a suitable alkali metal compound. These organoalkali metal compounds are hereinafter described in more detail.

It is known that certain elastomeric hydrocarbon polymers and copolymers, particularly certain polymers of conjugated dienes, have a tendency to cold flow in the unvulcanized state. For example, in the event that cracks or punctures develop in a package of rubber, the polymer or copolymer tends to flow therefrom leading to product loss or contamination or causing the packages to stick together. Further, after fabrication of these materials into finished products such as automobile tires, there is a decided tendency to considerably greater heat build-up during uses involving working than that which occurs in products comprising natural rubber.

We have found an effective terminating agent for terminating the polymerization of these monomers which results in an improved product. These thus terminated polymers have a reduced tendency to cold flow and also have less heat build-up as well as other improvements in other physical properties of the polymer and finished rubber.

It is an object of the invention to provide an improved terminated terminally-reactive polymeric material.

It is another object of the invention to provide a polymer of conjugated diene.

It is another object of the invention to provide a method for terminating the polymerization of conjugated dienes with organoalkali metal catalysts.

It is yet another object of the invention to provide a method for terminating the polymerization of conjugated dienes.

These and other objects of the invention will be readily apparent to those skilled in the art from the accompanying disclosure and claims.

These objects are boadly accomplished by preparing a vulcanizable, rubbery, terminally-reactive material of a polymerizable monomer in the presence of an organo-alkali metal catalyst and then terminating the reaction with a terminating agent having a formula selected from the group consisting of (1) 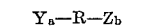
$$Y_a-R-Z_b$$

(2) 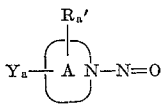

(3) 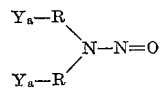

wherein Z is selected from the group consisting of $-NO_2$ and $-N=O$ radicals; each R is an aliphatic, cycloaliphatic, or aromatic hydrocarbon radical, including combinations thereof such as aliphatic-aromatic, aliphatic-cycloaliphatic, cycloaliphatic-aromatic, cycloaliphatic-aliphatic, aromatic-aliphatic, or aromatic-cycloaliphatic, having from 1 to 20 carbon atoms, inclusive; ring A in Formula 2 is a 5- or 6-membered ring having either 4 or 5 carbon atoms and an nitrogen atom; each Y is selected from the group consisting of halogen, $R'O-$ and $R'_2N-$, where each $R'$ is an alkyl group containing 1 to 4 carbon atoms; each "$a$" is an integer from 0 to 3, inclusive; "$b$" is an integer from 1 to 4, inclusive. Preferably R is an aromatic radical with or without alkyl substituents. The hydrocarbon portion of the terminating agent employed can contain one or more double bonds, preferably one to three double bonds. The halogens include chlorine, bromine, iodine, and fluorine, preferably chlorine or bromine.

To better understand the process involved, the following discussion of the reactions believed to be involved is presented although the invention is not to be limited by any proposed mechanism.

The organoalkali metal compound initiates the polymerization reaction with the organo radical ordinarily being incorporated in the polymer chain and an alkali metal atom being attached terminally at each end of the polymer chain if an organo polyalkali metal compound is employed and at one end if an organo monoalkali metal compound is used. The polymers in general will be linear polymers having two ends; however, polymers containing more than two ends can be prepared. The general reaction can be illustated graphically using $RM_2$ to represent an organodialkali metal compound, as follows:

$$\text{M-R-M} + x[C_4H_6] \longrightarrow \text{M-R}[C_4H_6]_x\text{-M}$$
Organo-    Butadiene
alkali
metal
compound or

$$\text{M-}[C_4H_6]_n\text{-R-}[C_4H_6]_{x-n}\text{-M}$$

or combinations thereof.

A specific example is:

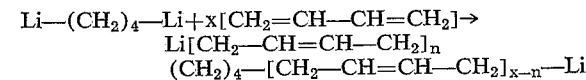
$$\text{Li-}(CH_2)_4\text{-Li} + x[CH_2=CH-CH=CH_2] \rightarrow$$
$$\text{Li}[CH_2-CH=CH-CH_2]_n$$
$$(CH_2)_4\text{-}[CH_2-CH=CH-CH_2]_{x-n}\text{-Li}$$

In the specific example 1,4-addition of butadiene is shown; however, it should be understood that 1,2-addition can also occur.

While organo compounds of the various alkali metals are employable in carrying out the polymerization, by far the best results are obtained with organolithium compounds which give very high conversions to the terminally reactive polymer. The organic radical of the organopolyalkali metal compound can be an aliphatic, cycloaliphatic or aromatic radical. For example, di- and polyalkali metal substituted hydrocarbons are employable, including 1,4-dilithiobutane,
1,5-dipotassiopentane,
1,4-disodio-2-methylbutane,
1,6-dilithiohexane,
1,10-dilithiodecane,
1,15-dipotassiopentadecane,
1,20-dilithioeicosane,
1,4-disodio-2-butene,
1,4-dilithio-2-methyl-2-butene,
1,4-dilithio-2-butene,
1,4-dipotassio-2-butene,
dilithionaphthalene,
disodionaphthalene,
4,4'-dilithiobiphenyl,
disodiophenanthrene,
dilithioanthracene,
1,2-dilithio-1,1-diphenylethane,
1,2-disodio-1,2,3-triphenylpropane,
1,2-dilithio-1,2-diphenylethane,
1,2-dipotassiotriphenylethane,
1,2-dilithiotetraphenylethane,
1,2-dilithio-1-phenyl-1-naphthylethane,
1,2-dilithio-1,2-dinaphthylethane,
1,2-disodio-1,1-diphenyl-2-naphthylethane,
1,2-dilithiotrinaphthylethane,
1,4-dilithiocyclohexane,
2,4-disodioethylcyclohexane,
3,5-dipotassio-n-butylcyclohexane,
1,3,5-trilithiocyclohexane,
1-lithio-4-(2-lithiomethylphenyl)butane,
1,2-dipotassio-3-phenylpropane,
1,2-di(lithiobutyl)benzene,
1,3-dilithio-4-ethylbenzene,
1,4-dirubidiobutane,
1,8-dicesiooctane,
1,5,12-trilithiododecane,
1,4,7-trisodioheptane,
1,4-di(1,2-dilithio-2-phenylethyl)benzene,
1,2,7,8-tetrasodionaphthalene,
1,4,7,10-tetrapotassiodecane,
1,5-dilithio-3-pentyne,
1,8-disodio-5-octyne,
1,7-dipotassio-4-heptyne,
1,10-dicesio-4-decyne, and
1,11-dirubidio-5-hendecyne,
1,2-disodio-1,2-diphenylethane,
dilithiophenanthrene,
1,2-dilithiotriphenylethane,
dilithiomethane,
1,4-dilithio-1,1,4,4-tetraphenylbutane,
1,4-dilithio-1,4-diphenyl-1,4-dinaphthylbutane,
and the like.

Organomonoalkali metal initiators are also employable. For example, the following organolithium compounds are suitable for the preparation of these terminally reactive polymeric materials:

methyllithium,
n-butyllithium,
2-methyl-1-lithiobutane,
3-lithiooctane,
4,4-dimethyl-2-methyl-1-lithiopentane,
1-lithiodecene-4,
n-pentadecyllithium,
1-lithioeicosene-5,
4-cyclohexyl-1-lithiobutane,
6-cyclohexyl-4-cyclopentyl-1-lithiohexane,
2,5-di-n-propyl-1-lithiocyclohexane,
3-isobutyl-1-lithiocyclopentane,
phenyllithium,
3,6-di-n-butyl-1-lithiobenzene,
1-lithionaphthalene,
3,7-di-isopentyl-1-lithionaphthalene,
1-lithioanthracene, 2-methyl-6-n-propyl-1-lithioanthracene,
1-(n-butyllithio)-naphthalene,
2-lithiofluorene,
3-lithiochrysene,
5-lithiopyrene,
1-cyclohexyl-4-lithiobenzene,
1,5-cyclopentyl-3-lithionaphthalene,
p-tolyllithium,
1-lithiopentene-3,
and the like.

Although the organomonoalkali metal compounds have been described only with reference to the organolithium compounds, the invention is also applicable using the other alkali metals. However, certain specific initiators get better results than other and are preferred in carrying out the preparation of the terminally reactive polymers. For example, of the condensed ring aromatic compounds the lithium-naphthalene adduct is preferred, but the adducts of lithium with anthracene and biphenyl can be employed with good results. Of the compounds of alkali metals with polyaryl-substituted ethylenes, the preferred material is 1,2-dilithio-1,2-diphenylethane (lithium-stilbene adduct). It has been found that certain of the dialkali metal substituted organic compounds are difficult to prepare in the pure state. In many instances the compounds which are formed are mixtures of mono- and dialkali metal compounds. The mono-substituted compounds are polymerization initiators, but the polymer formed is monofunctional rather than difunctional. The organodialkali metal compounds which have been set forth as being preferred are those which, when prepared, contain a minimum of the monoalkali metal compound.

The amount of initiator which is used varies depending on the polymer prepared, and particularly the molecular weight desired. Usually the terminally reactive polymers are liquids, having molecular weights in the range of 1000 to about 20,000. However, depending on the monomers employed in the preparation of the polymers and the amount of initiator used, semi-solid and solid terminally reactive polymers can be prepared having molecular weigths up to 150,000 and higher which may be either rubbery or non-rubbery in nature. When the terminally reactive polymers are subjected to curing or reaction with polyfunctional compounds, materials of still higher molecular weight are obtained. Usually the initiator is used in amounts between about 0.25 and about 100 millimols per 100 grams of monomer, preferably in the range of between about 1 and about 30 millimols per 100 grams of monomer.

Formation of the terminally reactive polymers is generally carried out at a range of between about −100 and about +150° C., preferably between −75 and +75° C. The particular temperatures employed will depend on both the monomers and the initiators used in preparing the polymers. For example, it has been found that the organolithium initiators provide more favorable results at elevated temperatures whereas lower temperatures are required to effectively initiate polymerization to the desired product with the other alkali metal compounds.

It is preferred that the polymerization be carried out in the presence of a suitable diluent, such as benzene, toluene, cyclohexane, methylcyclohexane, xylene, n-butane, n-hexane, n-heptane, isooctane, and the like. Generally, the diluent is selected from hydrocarbons, e.g., paraffins, cycloparaffins, and aromatics containing from 4 to 10 carbon atoms per molecule. It is usually preferred to employ aromatic hydrocarbons as the diluent. It is also within the scope of the invention to employ in admixture with the hydrocarbon diluent polar compounds which do not inactivate the organolithium catalyst. When employing an organolithium compound as the catalyst, it has been found that the use of polar compounds in admixture with the hydrocarbon diluent increases the reaction rate of the polymerization process. Examples of polar compounds which do not inactivate the organolithium catalyst and which may therefore be utilized with the hydrocarbon diluents are ethers, thioethers (sulfides), and tertiary amines. Specific examples of such polar materials include dimethyl ether, diethyl ether, ethyl butyl ether, di-n-propyl ether, di-n-octyl ether, tetramethylene oxide (tetrahydrofuran), dioxane, paraldehyde, anisole, 1,2-dimethoxyethane, dibenzyl ether, diphenyl ether, dimethyl sulfide, diethyl sulfide, di-n-propyl sulfide, di-n-butyl sulfide, methyl ethyl sulfide, dimethylethylamine, tri-n-propylamine, tri-n-butylamine, trimethylamine, triethylamine, N,N-dimethylaniline, pyridine, quinoline, N-ethylpiperidine, N-methyl-N-ethylaniline, N-methylmorpholine, and the like. It is to be understood also that mixtures of these polar compounds can be employed in the preparation of the polymer of the conjugated dienes. When a polar compound is used in admixture with the hydrocarbon diluent, the polar compound is usually present in an amount in the range of 0.05 to 50 percent by weight of the total solvent mixture.

As stated previously, the organodilithium compounds are preferred as initiators in the polymerization reaction since a very large percentage of the polymer molecules formed contain two terminal reactive groups, and also the polymerization can be carried out at normal room temperatures. This is not to say, however, that other organoalkali metal initiators cannot be employed; however, usually more specialized operation or treatment is required with these materials, including low reaction temperatures. Since it is desirable to obtain a maximum yield of terminally reactive polymer, it is within the scope of the invention to use separation procedures, particularly with alkali metal initiators other than lithium compounds, to separate terminally reactive polymer from the polymer product.

Since these terminally reactive polymers which have an active lithium atom on at least one end of the polymer chain will continue to grow if monomer is present, it is necessary to terminate the polymerization reaction by the addition of a material which will inactivate the lithium. It has now been found that certain nitro and nitroso compounds are effective for terminating the polymerization reaction and provide a terminated terminally-reactive polymer which may be cured by the addition of compounding agents and heat.

Non-limiting examples of the compounds that can be employed as terminating agents include:

nitromethane,
nitrobenzene,
nitrosobenzene,
nitrosomethane,
1,3-dinitrohexane,
1,5-dinitrosohexane,
6,8,12-trinitro-1-dodecene,
5,9,11-trinitroso-1-dodecene,
3-nitrocyclopentene,
2-nitrosocyclopentene,
4-nitrocyclohexene,
2-nitrosocyclohexene,
1-cyclohexyl-3-nitrobenzene,
1-phenyl-3-nitrosobenzene,
1,3,5-trinitrobenzene,
1,3,5-trinitrosobenzene,
2,4,6-trinitrotoluene,
2,4,6-trinitrosotoluene,
6-nitroindene,
3-nitrosoindene,
2,3,6,7-tetranitronaphthalene,
1,4,5,8-tetranitrosonaphthalene,
2,7-dinitrofluorene,
3,9-dinitrosofluorene,
1,3,5,7-tetranitrophenanthrene,
2,6,8,10-tetranitrosophenanthrene,
1,3,10,12-tetranitrochrysene, 2,6,8,11-tetranitroso-4-ethylchrysene,
3-phenyl-1-nitropropane,
3-cyclohexyl-1-nitrosopropane,
3-cyclohexyl-5-cyclopentyl-1,6-dinitrohexane,
3-cyclohexyl-4-cyclopentyl-1,6-dinitrosohexane,
3-n-butyl-1,4-dinitrobenzene,
3-n-hexyl-1,4-dinitrosobenzene,
1-isopentyl-3,5-ninitrobenzene,
2-isopentyl-1,5-dinitrosobenzene,
1,3,5-trinitrocyclohexane,
1,3,5-trinitrosocyclohexane,
1-nitro-3,4-dimethylcyclopentane,
1-nitroso-2,5-dimethylcyclopentane,
1-methyl-2-ethyl-3-nitrocyclohexene-5,
1-methyl-2-propyl-4-nitrosocyclohexene-5,
1,4-dicyclohexyl-2-nitrobenzene,
1,4-dicyclopentyl-2-nitrosobenzene,
1-cyclohexyl-6-n-butyl-3,7-dinitronaphthalene,
1-cyclohexyl-4-n-butyl-2,6-dinitrosonaphthalene,
1-phenyl-5-p-tolyl-3-nitrocyclohexane,
1-phenyl-3-p-tolyl-5-nitrosocyclohexane,
1-phenyl-2,3-dinitrocyclopentene-4,
1-phenyl-2,3-dinitrosocyclopentene-2,
o-nitrotoluene,
p-nitrosotoluene,
2,4-dinitrotoluene,
3,5-dinitrosotoluene,
2,4-dinitro-6-isobutylcyclohexene,
1,3-dinitroso-6-isoamylcyclohexene,
2-nitrobutadiene-1,3,
3-nitrosohexadiene-1,5,
11-nitroeicosatriene-1,5,7, and the like. In addition to the C-nitroso

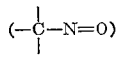

compounds listed above, the N-nitroso (>N—N=O) compounds are also employable as the terminating agent of the invention. Suitable N-nitroso compounds include the following:
N-methyl-N-nitrosoaniline,
N-nitroso-N-phenylbenzylamine,
N-nitrosopiperidine,
2-methyl-N-nitrosopiperidine,
3,5-di-n-butyl-N-nitrosopiperidine,
N-nitrosodiethylamine,
2,3,5-triethyl-N-nitrosopyrrolidine,
N-nitrosodimethylamine,
3-N-nitroso-N-phenylamino-5-N,N-diethylaminopentane,
N-propyl-N-nitroso-3-ethylaniline,
N-nitrosopyrrole,
N-nitrosopyrrolidine,
N-nitroso-N-ethylcyclohexylamine,
N-nitroso-N-methylcyclopentylamine,
N-nitroso-N-propyl-3-n-butylcyclohexylamine,
N-nitroso-N-methyl-2-ethylcyclopentylamine, and the like.

In addition to the nitro and nitroso compounds listed above, it is also possible to use terminating agents containing at least one nitro or nitroso group and other relatively less active substituents such as alkoxy, tertiary amine, halogen, and the like. Suitable compounds are
nitrochloromethane,
nitrosochloromethane,
2,3-dinitro-6,7-diethoxy-4-chloronaphthalene,
1,3-dinitro-4,5-dipropoxycyclohexane,
1-nitroso-4-chlorobenzene,
1-nitroso-3-ethoxybenzene,
1-nitroso-4-N,N-dimethylaminobenzene,
2-nitroso-3-methoxy-5-chlorohexane,
N-methyl-N-nitroso-4-methoxyaniline,
1-nitro-3-N,N-diethylaminocyclopentane,
o-chloro-p-nitrosotoluene,
1-nitro-4-chlorobenzene,
1-nitro-4-ethoxybenzene,
1-nitro-4-N,N-di-n-butylaminobenzene,
1-nitroso-4-nitrobenzene, and the like.

The invention is not limited to any particular conditions for the polymerization step. The polymerization reaction can be carried out under autogenous pressures. It is usually desirable to operate at pressures sufficient to maintain the monomeric material substantially in the liquid phase. The pressure will thus depend upon the particular material being polymerized, the diluent being employed, and the temperature at which polymerization is conducted. However, higher pressures can be employed if desired, these pressures being obtained by some such suitable method as the pressurization of a reactor with a gas which is inert with respect to the polymerization reaction.

When it is desired to terminate the polymerization, which generally requires less than 100 hours and often less than 50 hours, the terminating agent of the invention is introduced into the polymerization zone. The terminating agent is preferably introduced in the presence of a hydrocarbon diluent such as those employed in the polymerization step, although it may be introduced separately. The reactor conditions are then maintained at substantially the same level as those employed in the polymerization step for a period of time sufficient for the terminating agent to react with at least a portion of the polymer molecules, preferably with at least 90 percent of the polymer molecules or substantially all of them. The terminating agent also tends to inactivate any remaining organolithium catalyst. Preferably the desired conditions are maintained for a period of time in the range of 1 minute to 100 hours, more preferably 1 hour to 80 hours during the terminating step.

The terminating agents of the invention are added in a concentration in the range of about 0.01 to about 80 millimols, preferably 0.05 to 50 millimols per hundred parts by weight of monomer.

Subsequent to the termination step, the polymer is recovered by any suitable means such as by admixing the solution with suitable coagulant and antioxidant or other suitable stabilizing materials such as phenyl-β-naphthylamine. The polymer is then recovered by conventional means. The polymer solution may then be introduced into an extractor-extruder wherein substantially all of the diluent is removed from the polymer solution. A diluent-free polymer is withdrawn from the product end of the extractor-extruder.

The term "rubbery polymer" includes an elastomeric, vulcanizable, polymeric material, which after vulcanization, that is, cross-linking, possesses the properties normally associated with vulcanized rubber including materials which when compounded and cured exhibit reversible extensibility at 80° F. of over 100 percent of a specimen's original length with a retraction of at least 90 percent within 1 minute after release of the stress necessary to elongate to 100 percent.

The rubbery polymers produced in accordance with this invention can be compounded by any of the known methods, such as have been used in the past for compounding natural rubber and synthetic rubbers. Vulcanizing agents, vulcanization accelerators, reinforcing agents, fillers, softeners, extenders, antioxidants, pigments and the like, such as have been employed in natural rubber and synthetic rubbers, can likewise be used in the compounds of this invention. The rubbery polymers have utility in applications where natural and synthetic rubbers are employed. For example, they can be used in the manufacture of automobile tires, gaskets, hose and other rubbery articles.

The vulcanizable rubbery polymers of conjugated dienes produced herein may be vulcanized with conventional sulfur recipes as well as non-sulfur recipes such as peroxide recipes. The method of vulcanization or curing is not limitative on the invention.

The invention is best illustrated by reference to the following non-limitative examples:

EXAMPLE I

Butadiene was polymerized using the following recipe and experimental conditions:

| | Parts by weight |
|---|---|
| Butadiene | 100 |
| Cyclohexane | 780 |
| n-Butyllithium | 0.064 |
| Time, hours | 5 |
| Temperature, ° C. | 50 |

Cyclohexane was added to the reactor bottles, and they were purged with nitrogen and capped with rubber and perforated crown caps. Butadiene was added with a dispenser and n-butyllithium (in cyclohexane solution) with a syringe. The bottles were then turned in a constant temperature bath at 50° C. for 5 hours. The reaction was terminated with sufficient isopropyl alcohol containing 10 weight percent antioxidant (2,2'-methylene-bis-[4-methyl-6-tert-butyl phenol]) to give one part of antioxidant per 100 parts of polymer, and the polymer was coagulated with isopropyl alcohol. This polymer was then compounded using the following recipe:

| | Parts by weight |
|---|---|
| Polymer | 100 |
| IRB #1 high abrasion furnace black | 50 |
| Zinc oxide | 3 |
| Stearic acid | 1 |
| Flexamine (a) | 1 |
| Resin 731D (b) | 5 |
| Philrich 5 (c) | 5 |
| Sulfur | 1.75 |
| NOBS Special (d) | 1.1 |

(a)–(d)—See notes at end of specification.

The compounded rubber was cured 30 minutes at 153° C. and oven-aged 24 hours at 100° C. Comparative properties for this control sample and the samples of Examples II, III, IV and V, in which a terminating agent of our invention was used, are shown in Table I following Example V.

EXAMPLE II

Butadiene was polymerized as in Example I except that 0.102 part of n-butyllithium was used, and that after 4 hours 0.53 mhm. of 1,3,5-trinitrobenzene (in toluene solution) was introduced by syringe and the mixture was maintained at 50° C. for 18 hours for termination. Subsequent handling of the polymer was the same. Properties are given in Table I following Example V.

EXAMPLE III

Butadiene was polymerized as in Example I except that 0.120 part of n-butyllithium was used, and that after 2 hours 0.43 mhm. of 1,3,5-trinitrobenzene (in toluene solution) was introduced by syringe and the mixture maintained at 50° C. for 70 hours for termination. Subsequent handling of the polymer was the same. Properties are given in Table I following Example V.

EXAMPLE IV

Butadiene was polymerized as in Example I except that 0.090 part of n-butyllithium was used, and that after 4 hours 1.6 mhm. of o-nitrotoluene (in toluene solution) was introduced by syringe and the mixture maintained at 50° C. for 18 hours for termination. Subsequent handling of the polymer was the same. Properties are given in Table I following Example V.

EXAMPLE V

Butadiene was polymerized as in Example I except that 0.0096 part of n-butyllithium was used, and that after 4 hours 1 mhm. of 2,4-dinitrotoluene (in toluene solution) was introduced by syringe and the mixture maintained at 50° C. for 18 hours after termination. Subsequent handling of the polymer was the same. Properties are given in Table I following Example V.

TABLE I

| Example No. | I | II | III | IV | V |
|---|---|---|---|---|---|
| Raw polymer properties: | | | | | |
| Mooney (e), ML–4 at 100° C. | 36.1 | 34.9 | 37.0 | 40 | 40 |
| Cold flow (f), mg./min. | *41.9 | 4.8 | 2.5 | 16 | 8.5 |
| Processing properties: | | | | | |
| Compounded MS–1½ (g) at 100° C. | 34.4 | 30.5 | 36.8 | 51 | 43.4 |
| Scorch (h) at 138° C., min. | 17.3 | 21.7 | 22.6 | 16.8 | 22.6 |
| Extrusion at 121° C., in./min. | 53.0 | 62.0 | 57.5 | 67.5 | 57.5 |
| Rating (Garvey Die) (i) | 8– | 11+ | 8+ | 5 | 8– |
| Physical properties (30 min. cure at 153° C.): | | | | | |
| $v \times 10^4$ (j), moles/cc. | 1.97 | 1.90 | 1.89 | 2.4 | 2.27 |
| Compression set (k), percent | 22.6 | 26.2 | 28.0 | 18.2 | 20.6 |
| 300% Modulus (l), p.s.i. | 1,140 | 1,195 | 1,150 | 1,300 | 1,220 |
| Tensile (l), p.s.i. | 2,275 | 2,375 | 2,360 | 2,280 | 2,275 |
| Elongation (l), percent | 470 | 460 | 480 | 430 | 420 |
| Tear (m) at 93° C., lb./in. | 95 | 120 | 135 | 120 | 105 |
| $\Delta T$ (n), ° F. | 56.8 | 55.1 | 53.8 | 48.0 | 49.0 |
| Resilience (o), percent | 67.2 | 70.1 | 72.2 | 75.8 | 75.1 |
| Oven-aged (24 hr. at 100° C.): | | | | | |
| 200% Modulus (l), p.s.i. | 1,330 | 1,380 | 1,280 | 1,225 | 1,180 |
| Tensile (l), p.s.i. | 1,820 | 1,930 | 1,890 | 1,580 | 1,830 |
| Elongation (l), percent | 250 | 240 | 275 | 235 | 270 |
| $\Delta T$ (n), ° F. | 49.9 | 37.1 | 38.8 | 33.4 | 34.3 |
| Resilience (o), percent | 73.6 | 76.3 | 79.8 | 83.8 | 83.8 |

*Interpolated from cold flow data for control polymers having Mooney viscosities of 29, 42 and 51.

(e), (f), (g), (h), (i), (j), (k), (l), (m), (n), (o)—See notes at end of specification.

Comparison of the properties for the polymers and finished rubbers made with the terminating agent of our invention with those for the control indicates that the cold flow of the raw polymer and heat build-up ($\Delta T$) of the oven-aged rubber are considerably reduced. Also tear is improved.

The use of our invention to improve the above-mentioned properties of the cured stocks is particularly outstanding since it will be noted that there has been no degradation (and in some instances an improvement) of the other physical properties of the cured stocks such as modulus, tensile, elongation, scorch, etc.

EXAMPLE VI

Butadiene was polymerized according to the following recipe and polymerization conditions, and the polymer was then terminated with trinitrobenzene under the following termination conditions. The procedure was essentially the same as that described in Example I.

*Recipe*

Polymerization:

| | |
|---|---|
| Butadiene, weight parts | 100 |
| Toluene, weight parts | 860 |
| n-Butyllithium, mhm. (s) | 1.5 |
| Temperature, ° F. | 122 |

Polymerization:
    Time, hrs. _____ 2.5
Termination:
    Trinitrobenzene _____ Variable
    Temperature, °F. _____ 122
    Time, hrs. _____ 64

(a)–(d)—See notes at end of specification.

TABLE II

| Run No. | BuLi, mhm (s) | TNB mhm (s) | I.V. (p) (Gel Free) | ML-4 (e) | Cold Flow (f) mg./min. |
|---|---|---|---|---|---|
| 1 | 1.5 | | 1.43 | 5.0 | 169 |
| 2 | 1.5 | 0.24 | 2.23 | 54.2 | 3.1 |
| 3 | 1.5 | 0.5 | 2.28 | 59.1 | 2.0 |

(s), (p), (e), (f)—See notes at end of specification.

It will be seen from Table II that the termination of the terminally reactive polymer of butadiene with trinitrobenzene drastically reduces cold flow and increases Mooney. Evidence of increased coupling is shown by the increase in inherent viscosity.

EXAMPLE VII

Polybutadienyl lithium prepared according to the following polymerization recipe was terminated with trinitrobenzene or trinitrotoluene according to the following termination recipe and the procedure of Example I.

*Recipe*

Polymerization:
    Butadiene, weight parts _____ 100
    Toluene, weight parts _____ 860
    n-Butyllithium, mhm. (s) _____ Variable
    Temperature, °F. _____ 122
    Time, hours _____ 4
    Scavenger level (q), mhm. (s) _____ 2.0
Termination:
    Nitro compound _____ Variable
    Time at 122° F., hours _____ 1

(s), (q)—See notes at end of specification.

TABLE III

| Run No. | BuLi, mhm(s) | TNB, mhm(s) | TNT, mhm(s) | I.V.(p) (Gel Free) |
|---|---|---|---|---|
| 1 | 3.6 | | | 0.83 |
| 2 | 3.6 | 0.5 | | 1.17 |
| 3 | 3.6 | | 0.5 | 1.06 |
| 4 | 5.0 | | | 0.54 |
| 5 | 5.0 | 1.0 | | 0.78 |
| 6 | 5.0 | | 1.0 | 0.80 |

(s), (p)—See notes at end of specification.

The above data demonstrate the degree of coupling taking place by the addition of either trinitrobenzene or trinitrotoluene.

EXAMPLE VIII

Butadiene was polymerized according to the following polymerization recipe and the polymer was terminated with varying amounts of trinitrobenzene according to the following termination recipe and the procedure of Example I.

*Recipe*

Polymerization:
    Butadiene, weight parts _____ 100
    Cyclohexane, weight parts _____ 780
    n-Butyllithium, mhm. (s) _____ 1.5
    Temperature, °F. _____ 122
    Time, hours _____ 4
    Scavenger level (q), mhm. (s) _____ 0.75
Termination:
    Trinitrobenzene _____ Variable
    Temperature, °F. _____ 122
    Time, hours _____ 18

(s), (q)—See notes at end of specification.

TABLE IV

| Run No. | TNB mhm(s) | Mooney (e) ML-4 | I.V. (p) (Gel Free) | Cold Flow (f) mg./min. | Molecular Weight (r) |
|---|---|---|---|---|---|
| 1 | | 12.2 | 1.73 | 150 | 143,000 |
| 2 | 0.5 | 94.0 | 2.78 | 0.8 | 294,000 |
| 3 | 0.6 | 92.4 | 2.79 | 0.5 | 295,000 |
| 4 | 0.7 | 100 | 2.83 | 0.6 | 302,000 |
| 5 | 0.8 | 103.6 | 2.85 | 0.4 | 305,000 |
| 6 | 0.9 | 118 | 3.02 | 0.4 | 335,000 |
| 7 | 1.0 | 112.2 | 2.93 | 0.2 | 320,000 |
| 8* | 0.75 | 12.9 | 1.78 | 86 | 148,000 |

*Polymer was killed with isopropyl alcohol before addition of the TNB.
(s), (e), (p), (f), (r)—See notes at end of specification.

These runs again demonstrate the effect of trinitrobenzene on cold flow and Mooney as well as pointing out further its effect on molecular weight. Run 8 demonstrates that the terminating agent must react with the lithium terminated polymer since the addition of the alcohol before adding the trinitrobenzene is relatively ineffective.

EXAMPLE IX

Butadiene was polymerized according to the following polymerization recipe and the polymer was terminated with ortho-nitrotoluene or 2,4-dinitrotoluene according to the following termination conditions and the procedure of Example I.

*Recipe*

Polymizeration:
    Butadiene, weight parts _____ 100
    Cyclohexane, weight parts _____ 780
    n-Butyllithium mhm. (s) _____ 2.0
    Temperature, °F. _____ 122
    Time, hours _____ 3.5
Termination:
    o-Nitrotoluene _____ Variable
    2,4-dinitrotoluene _____ Variable
    Temperature, °F. _____ 122
    Time, hours _____ 18

(s)—See notes at end of specification.

TABLE V

| Run No. | oNT mhm(s) | I.V.(p) (Gel Free) | Cold Flow(f) mg./min. | Run No. | DNT mhm(s) | I.V.(p) (Gel Free) | Cold Flow(f) mg./min., 25° C. |
|---|---|---|---|---|---|---|---|
| 1 | | 1.33 | 211 | 7 | | 1.16 | 360 |
| 2 | 0.3 | 1.64 | 39 | 8 | 0.1 | 1.47 | 58 |
| 3 | 0.5 | 1.62 | 43 | 9 | 0.2 | 1.60 | 34 |
| 4 | 0.8 | 1.63 | 41 | 10 | 0.4 | 1.69 | 15 |
| 5 | 1.0 | 1.61 | 39 | 11 | 0.6 | 1.71 | 15 |
| 6 | 1.5 | 1.65 | 36 | 12 | 1.5 | 1.75 | 13 |

(s), (p), (f)—See notes at end of specification.

These runs demonstrate the effectiveness of mononitroaromatic and dinitroaromatic terminating agents.

EXAMPLE X

A butadiene-styrene copolymer prepared with n-butyllithium catalyst was terminated with ether trinitrotoluene or an excess of isopropyl alcohol (as control) according to the following polymerization and termination recipes and the procedure of Example I.

*Recipe*

Polymerization:
| | |
|---|---|
| Butadiene, weight parts | 75 |
| Styrene, weight parts | 25 |
| Cyclohexane, weight parts | 780 |
| Tetrahydrofuran, weight parts | 1.5 |
| n-Butyllithium, mhm. (s) | Variable |
| Temperature, °F. | 122 |
| Time, hours | 18 |
| Scavenger level (q), mhm. (s) | 0.6 |

Termination:
| | |
|---|---|
| Isopropyl alcohol | [1] Excess |
| Trinitrotoluene | Variable |
| Temperature, °F. | 122 |
| Time, hours | 6 |

[1] An excess of the amount necessary to effect complete termination.

(s), (q)—See notes at end of specification.

TABLE VI

| Run No. | BuLi, mhm(s) | TNT mhm(s) | IPA, mhm* | I.V.(p) (Gel Free) | Mooney(e) ML-4 | Cold Flow(f) mg./min. |
|---|---|---|---|---|---|---|
| 1 | 1.5 | 0.3 | | 1.44 | 27.5 | 4.1 |
| 2 | 1.6 | 0.33 | | 1.39 | 20.5 | 6.7 |
| 3 | 1.7 | 0.37 | | 1.42 | 18 | 8.5 |
| 4 | 1.8 | 0.4 | | 1.23 | 15 | 11 |
| 5 | 1.9 | 0.43 | | 1.19 | 13.5 | 8.7 |
| 6 | 2.0 | 0.47 | | 1.20 | 13.5 | 13 |
| 7 | 1.5 | | Excess | 1.44 | 20 | 9.3 |
| 8 | 1.6 | | do | 1.25 | 14 | 16 |
| 9 | 1.7 | | do | 1.25 | 13 | 19 |
| 10 | 1.8 | | do | 1.13 | 10 | 27 |
| 11 | 1.9 | | do | 1.15 | 9 | 29 |
| 12 | 2.0 | | do | 1.05 | 8 | 37 |

*An excess of the amount necessary to effect complete termination.
(s), (p), (e), (f)—See notes at end of specification.

These runs demonstrate the decrease in cold flow obtained in butadiene-styrene copolymers by the process of our invention.

EXAMPLE XI

A thermally reactive polybutadiene prepared with n-butyllithium catalyst according to the following recipe was terminated with nitrobenzene according to the following recipe and the procedure of Example I.

*Recipe*

Polymerization:
| | |
|---|---|
| Butadiene, weight parts | 100 |
| Cyclohexane, weight parts | 780 |
| n-Butyllithium, mhm. (s) | 3.0 |
| Temperature, °F. | 122 |
| Time, hours | 5 |
| Scavenger level (q), mhm. (s) | 0.9 |

Termination:
| | |
|---|---|
| Mononitrobenzene | Variable |
| Temperature, °F. | 122 |
| Time, hours | 3 |

(s), (q)—See notes at end of specification.

TABLE VII

| Run No. | NB mhm. (s) | I.V. (p) (Gel Free) | Molecular Weight (r) |
|---|---|---|---|
| 1 | | 0.88 | 50,000 |
| 2 | 0.6 | 1.19 | 79,000 |
| 3 | 1.1 | 1.19 | |
| 4 | 1.6 | 1.22 | 83,000 |
| 5 | 2.1 | 1.19 | |
| 6 | 3.1 | 1.22 | |
| 7 | 4.2 | 1.23 | 84,000 |
| 8 | 8.4 | 1.19 | |

(s), (p), (r)—See notes at end of specification.

These runs demonstrate that all the coupling attainable with the monoterminally reactive polymer is attained with a small amount of the terminating agent.

EXAMPLE XII

Terminally reactive polybutadiene was prepared with a n-butyllithium catalyst and terminated with 4-chloronitrobenzene according to the following polymerization and termination recipes and according to the procedure of Example I.

*Recipe*

Polymerization:
| | |
|---|---|
| Butadiene, weight parts | 100 |
| Cyclohexane, weight parts | 780 |
| n-Butyllithium, mhm. (s) | 3.0 |
| Temperature, °F. | 122 |
| Time, hours | 3 |
| Scavenger level (q), mhm. (s) | 0.8 |

Termination:
| | |
|---|---|
| 4-chloronitrobenzene | Variable |
| Temperature, °F. | 122 |
| Time, hours | See below |

(s), (q)—See notes at end of specification.

TABLE VIII

| Run No. | Termination Time, hrs. | CNB mhm. (s) | I.V. (p) (Gel Free) |
|---|---|---|---|
| 1 | 15 | | 0.83 |
| 2 | 15 | 0.6 | 1.14 |
| 3 | 15 | 1.1 | 1.16 |
| 4 | 15 | 1.6 | 1.35 |
| 5 | 15 | 2.1 | 1.19 |
| 6 | 15 | 3.1 | 1.20 |
| 7 | 15 | 4.2 | 1.16 |
| 8 | 15 | 8.4 | 1.16 |
| 9 | 3 | | 0.81 |
| 10 | 3 | 0.6 | 1.19 |
| 11 | 3 | 1.1 | 1.15 |
| 12 | 3 | 1.6 | 1.20 |
| 13 | 3 | 2.1 | 1.17 |
| 14 | 3 | 3.1 | 1.21 |
| 15 | 3 | 4.2 | 1.21 |
| 16 | 3 | 8.4 | 2.09 |

(s), (p)—See notes at end of specification.

These runs demonstrate the effectiveness of a chlorine-substituted nitro compound for terminating the polymer at both 3 hours and 15 hours.

EXAMPLE XIII

Terminally reactive polybutadiene was prepared with n-butyllithium catalyst according to the following polymerization recipe and terminated with either nitrobenzene or 4-chloronitrobenzene by the procedure of Example I except that the termination was either in a normal or inverse addition. In the normal addition the nitro compound was added to the polymerization mixture and maintained at the elevated temperature for the recited period of time. In the inverse addition method the reaction mixture from the polymerization step was added to a bottle containing the nitrobenzene and the recited termination conditions were maintained.

*Recipe*

Polymerization:
| | |
|---|---|
| Butadiene, weight parts | 100 |
| Cyclohexane, weight parts | 780 |
| n-Butyllithium, mhm. (s) | 3.0 |
| Temperature, ° F. | 122 |
| Time, hours | 5 |

Termination:
| | |
|---|---|
| Nitro compound | Variable |
| Temperature, ° F. | 122 |
| Time, hours | 0.5 |

(s)—See notes at end of specification.

TABLE IX

| Run No. | CNB, mhm. (s) | NB mhm. (s) | Addition Method | I.V. (p) (Gel Free) |
|---|---|---|---|---|
| 1 | | | | 0.79 |
| 2 | 2.1 | | Normal | 1.14 |
| 3 | 2.1 | | Inverse | 1.17 |
| 4 | 8.4 | | Normal | 1.22 |
| 5 | 8.4 | | Inverse | 1.21 |
| 6 | | 2.1 | Normal | 1.17 |
| 7 | | 2.1 | Inverse | 1.17 |
| 8 | | 8.4 | Normal | 1.15 |
| 9 | | 8.4 | Inverse | 1.15 |

(s), (p)—See notes at end of specification.

The above runs demonstrate that the method of addition has no significant effect on the final product.

EXAMPLE XIV

Diterminally reactive polybutadiene was prepared with a lithium-stilbene adduct (LISA) and terminated with nitrobenzene or 4-chloronitrobenzene by the procedure of Example I and by both the normal and inverse additions described in Example XIII according to the following polymerization and termination recipes. This initiator (LISA) is the reaction product of lithium with trans-stilbene and is essentially 1,2-dilithio-1,2-diphenylethane and is used as a 0.3 molar solution in a mixture of diethyl ether and tetrahydrofuran.

*Recipe*

Polymerization:
| | |
|---|---|
| Butadiene, weight parts | 100 |
| Cyclohexane, weight parts | 780 |
| LISA mhm. (s) | 4.4 |
| Temperature, ° F. | 122 |
| Time, hours | 3 |
| Scavenger level (q), mhm. (s) | 0.9 |

Termination:
| | |
|---|---|
| Nitro compound | Variable |
| Temperature, ° F. | 122 |
| time, hours | 16 |

(s), (q)—See notes at end of specification.

TABLE X

| Run No. | CNB mhm. (s) | NB mhm. (s) | Addition Method | I.V.(p) |
|---|---|---|---|---|
| 1 | | | | 1.12 |
| 2 | 6.2 | | Normal | 5.12 |
| 3 | 6.2 | | Inverse | 4.45 |
| 4 | 24.8 | | Normal | 5.46 |
| 5 | 24.8 | | Inverse | 4.75 |
| 6 | | 6.2 | Normal | 4.56 |
| 7 | | 6.2 | Inverse | 3.78 |
| 8 | | 24.8 | Normal | 5.23 |
| 9 | | 24.8 | Inverse | 4.38 |

(s), (p)—See notes at end of specification.

These runs demonstrate that a polybutadienyl lithium prepared with a lithium-stilbene adduct may be terminated by the method of this invention. The relatively large increase in inherent viscosity and corresponding molecular weight obtained with terminating agents of our invention indicate that multiple coupling is occurring, i.e. an excess of two of the diterminally reactive polymer molecules are coupled.

EXAMPLE XV

Polybutadienyl lithium prepared by a n-butyllithium catalyst and terminated with N-nitrosopiperidine was prepared according to the following polymerization and termination recipes and the procedure of Example I and found to have the following properties.

*Recipe*

Polymerization:
| | |
|---|---|
| Butadiene, weight parts | 100 |
| Cyclohexane, weight parts | 780 |
| n-Butyllithium, mhm. (s) | 1.6 |
| Temperature, ° F. | 122 |
| Time, hours | 4 |
| Scavenger level (q), mhm. (s) | 1.0 |

Termination:
| | |
|---|---|
| N-nitrosopiperidine | Variable |
| Temperature, ° F. | 122 |
| Time, hours | 18 |

(s), (q)—See notes at end of specification.

TABLE XI

| Run No. | NNP mhm. (s) | I.V. (p) (Gel Free) |
|---|---|---|
| 1 | 0 | 1.63 |
| 2 | 0.2 | 2.00 |
| 3 | 0.4 | 1.98 |

(s), (p)—See notes at end of specification.

These data indicate that coupling occurs with N-nitrosopiperidine.

EXAMPLE XVI

Butadiene was polymerized with a lithium-stilbene adduct (LISA) prepared as described in Example XIV and the polymer was terminated with either isopropyl alcohol or N-nitrosopiperidine followed by isopropyl alcohol according to the following polymerization and termination recipies and the procedure of Example I.

*Recipe*

| | Run Number | |
|---|---|---|
| | 1 | 2 |
| Polymerization: | | |
| Butadiene, weight parts | 100 | 100 |
| Cyclohexane, weight parts | 780 | 780 |
| LISA, mhm. (s) | 20 | 20 |
| Temperature, ° F. | 122 | 122 |
| Time, hours | 18 | 3 |
| Termination: | | |
| Isopropyl alcohol, ml | 2 | |
| N-nitrosopiperidine, m m. (s) | | 40 |
| Temperature, ° F. | | 122 |
| Time, hours | | 15 |

TABLE XII

| Run No. | I.V. (p) (Gel Free) | After Aging at 80° C. for 18 Hours | |
|---|---|---|---|
| | | I.V. (p) | Gel, Percent |
| 1 | 0.44 | 0.43 | 0 |
| 2 | 0.51 | 0.61 | 0 |

(p)—See notes at end of specification.

TABLE XIII

| Run No. | Polymer From Run 2, gm. | PAPI* Drops | After Curing at 80° C for 18 Hours | |
|---|---|---|---|---|
| | | | I.V. (p) | Gel, Percent |
| 3 | 3 | 1 | 0.52 | 42 |
| 4 | 3 | 2 | 0.49 | 45 |
| 5 | 3 | 3 | 0.55 | 47 |
| 6 | 3 | 4 | 0.49 | 47 |

*(Polymethylene) polyphenylisocyanate—1 drop=0.332 g.
(p)—See notes at end of specification.

No gel is formed when the polymer from Run 1 is treated with PAPI, which is known to react with hydroxy groups. This indicates that no hydroxy groups are present in the polymer, which is consistent with the termination reaction shown in the following equation:

$$LiPLi + 2C_3H_7OH = HPH + 2C_3H_7OLi$$

Formation of gel when the polymer of Run 2 is treated with PAPI indicates that hydroxy groups are present, which is consistent with the termination with N-nitrosopiperidine according to the following equations:

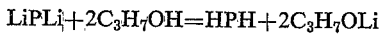

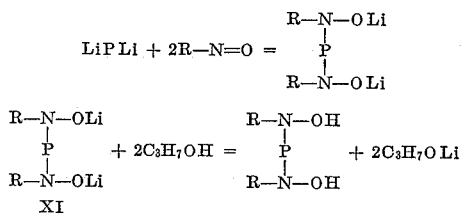

NOTES (a) 65% diarylamine-ketone reaction product and 35% N,N'-diphenyl-p-phenylenediamine.

(b) A disproportionated pale rosin.

(c) Aromatic petroleum oil.

(d) N-oxydiethylene benzothiazole-2-sulfenamide.

(e) ASTM D-1646-61, Mooney Viscometer, large rotor, 4 minutes, 212° F.

(f) Cold flow is measured by extruding the rubber through a ¼-inch orifice at 3.5 p.s.i. pressure and a temperature of 50° C. (122° F.) unless otherwise indicated. After allowing 10 minutes to reach steady state, the rate of extrusion is measured and reported in milligrams per minute.

(g) ASTM D-1646-61, Mooney Viscometer, small rotor, 1½ minutes, 212° F.

(h) ASTM D-1646-61, Mooney Viscometer, large rotor. Scorch is time in minutes to 5-point rise above minimum Mooney.

(i) Ind. Eng. Chem. 34, 1309 (1942). A No. ½ Royle Extruder is used with a Garvey die. The rating is based on 12 for a perfectly formed extruded product, with the lower numbers indicating less nearly perfect products.

(j) Rubber World 135, 67–73, 254–260 (1956).

(k) ASTM D-395-61, Method B (modified). Compression devices are used with 0.325-inch spacers to give a static compression for the 0.5-inch pellet of 35 percent. Test is run for 2 hours at 212° F., plus relaxation for 1 hour at 212° F.

(l) ASTM D-412-61T. Scott Tensile Machine L-6. Tests are made at a temperature of 80° F. unless otherwise designated.

(m) ASTM D-624-65, Die A.

(n) ASTM D-623-58. Method A, Goodrich Flexometer, 143 lbs./sq. in load, 0.175-inch stroke. Test specimen is a right circular cylinder 0.7-inch in diameter and 1 inch high.

(o) ASTM D-945-59 (modified). Yerzley oscillograph. Test specimen is a right circular cylinder 0.7 inch in diameter and 1 inch high.

(p) One-tenth gram of polymer was placed in a wire cage made from 80 mesh screen and the cage was placed in 100 ml. of toluene contained in a wide-mouth, 4-ounce bottle. After standing at room temperature (approx. 77° F.) for 24 hours, the cage was removed and the solution was filtered through a sulfur absorption tube of grade C porosity to remove any solid particles present. The resulting solution was run through a Medalia type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the soluble portion of the original sample.

(q) Amount of n-butyllithium required to scavenge the system of poisons. The catalyst amount includes that used for scavenging. For example, the n-butyllithium actually available for polymerization in Run 1, Example VII, is 3.6 less 2.0 or 1.6 mhm.

(r) Based on I.V.$=7.76 \times 10^{-4}$ $(M_n^{0.65})$ where $M_n$=number average molecular weight.

(s) Moles per hundred parts by weight of monomer.

Although certain examples, structures, composition and process steps have been described for purposes of illustration, the invention is not limited to these. Variation and modification within the scope of the invention and claims can readily be effected by those skilled in the art.

We claim:

1. A process for the termination of the catalyst polymerization of a monomer selected from the group consisting of (1) a conjugated diene having from 4 to 12 carbon atoms per molecule and (2) a mixture of (1) and a vinyl-substituted aromatic compound having from 8 to 16 carbon atoms per molecule, inclusive, said polymerization occurring under polymerization conditions in the presence of a catalyst comprising $RLi_x$ wherein R is a hydrocarbon radical selected from the group consisting of alkyl, cycloalkyl and aryl radicals and $x$ is an integer from 1 to 4, comprising introducing into the polymerization zone a terminating agent having a formula selected from the group consisting of (1) $Y_a—R—Z_b$ (2) 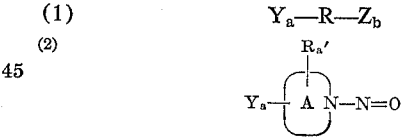

and (3) 

wherein Z in selected from the group consisting of —NO₂ and —N=O radicals, $b$ is an integer of 1 to 4, each Y is selected from the group consisting of halogen, R'O— and R'₂N—, each $a$ is an integer of 0 to 3, each R is selected from the group consisting of aliphatic, cycloaliphatic and aromatic hydrocarbon radicals and combinations thereof having 1 to 20 carbon atoms, ring A in Formula 2 is a 5- to 6-membered heterocyclic ring having 4 to 5 carbon atoms and a nitrogen atom, and R' is an alkyl radical having 1 to 4 carbon atoms, said polymerization conditions being maintained for a period of time of at least about 1 minute after introduction of said terminating agent.

2. A process for the termiantion of the catalyzed polymerization of a monomer selected from the group consisting of (1) a conjugated diene having from 4 to 12 carbon atoms per molecule and (2) a mixture of (1) and a vinyl substituted aromatic compound having from 8 to 16 carbon atoms per molecule, inclusive, said polymerization occurring under polymerization conditions in the presence of a catalyst comprising $RLi_x$ wherein R is a hydrocarbon radical selected from the group consisting of alkyl, cycloalkyl and aryl radicals and $x$ is an integer from 1 to 4, comprising introducing into the polymerization zone a terminating agent selected from the group consisting of nitro and nitroso compounds having the structural formulae recited in claim 1, said polymerization conditions being maintained for a period of time in the range of 1 minute to 100 hours after introduction of the terminating agent.

3. The process of claim 2 wherein said terminating agent is introduced into said polymerization zone in an amount in the range of about 0.01 to about 80 gram millimoles of said terminating agent per 100 grams of said monomer.

4. The process of claim 2 wherein said catalyst comprises n-butyllithium.

5. The process of claim 2 wherein said catalyst comprises the reaction product of lithium and trans-stilbene.

6. The process of claim 2 wherein said terminating agent comprises 1,3,5-trinitrobenzene.

7. The process of claim 2 wherein said terminating agent comprises orthonitrotoluene.

8. The process of claim 2 wherein said terminating agent comprises 2,4-dinitrotoluene.

9. The process of claim 2 wherein said terminating agent comprises 4-chloronitrobenzene.

10. The process of claim 2 wherein said terminating agent comprises N-nitrosopiperidine.

11. The process of claim 2 wherein said monomer comprises 1,3-butadiene.

12. The process of claim 2 wherein said monomer comprises a mixture of 1,3-butadiene and styrene.

13. A process for the termination of the catalyzed polymerization of 1,3-butadiene, said polymerization occurring at a temperature in the range −110 to 300° F. in the presence of a hydrocarbon diluent under a pressure sufficient to maintain liquid phase conditions and in the further presence of a n-butyllithium catalyst thereby producing a terminally reactive polymer, comprising introducing into the polymerization zone a terminating agent selected from the group consisting of nitro and nitroso compounds having a structural formulae recited in claim 1 in an amount in the range of about 0.01 to about 80 gram millimoles of said terminating agent per 100 grams of said 1,3-butadiene and maintaining said polymerization conditions for a period of time in the range of 1 minute to 100 hours and sufficient to terminate said polymerization process.

14. A vulcanizable rubbery polymer prepared by the process of claim 1.

15. A vulcanizable rubbery polymer of 1,3-butadiene polymerized in the presence of n-butyllithium to form a terminally reactive polymer, said polymerization being terminated with a terminating agent selected from nitro and nitroso compounds having the formulae recited in claim 1, wherein polymerization conditions are maintained for a period of time of at least about 1 minute after introduction of said terminating agent.

16. The process of claim 2 wherein said terminating agent comprises 1,3,5-trinitrotoluene.

17. The process of claim 2 wherein said terminating agent comprises nitrobenzene.

18. A vulcanizable rubbery polymer prepared by the process of claim 10.

References Cited

UNITED STATES PATENTS

| | | | |
|---|---|---|---|
| 2,217,631 | 10/1940 | Wolfe | 260—84.7 |
| 2,915,507 | 12/1959 | Uraneck et al. | 260—84.3 |
| 3,055,952 | 9/1962 | Goldberg | 260—94.7 |
| 3,109,871 | 11/1963 | Zelinski et al. | 260—94.7 |
| 3,116,250 | 12/1963 | Krukziener | 260—645 |
| 3,135,716 | 6/1964 | Uraneck et al. | 260—94.2 |

OTHER REFERENCES

Journal of American Chemical Society, vol. 70, pages 486–489, February 1948.

JOSEPH L. SCHOFER, *Primary Examiner.*

JAMES A. SEIDLECK, *Assistant Examiner.*